US008200473B1

(12) United States Patent
Dropps et al.

(10) Patent No.: US 8,200,473 B1
(45) Date of Patent: Jun. 12, 2012

(54) EMULATION OF MULTIPLE MDIO MANAGEABLE DEVICES

(75) Inventors: Frank R. Dropps, Maple Grove, MN (US); Edward C. Ross, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 409 days.

(21) Appl. No.: 12/547,414

(22) Filed: Aug. 25, 2009

Related U.S. Application Data

(60) Provisional application No. 61/091,701, filed on Aug. 25, 2008.

(51) Int. Cl.
*G06F 9/44* (2006.01)

(52) U.S. Cl. .......................................... 703/21; 714/43

(58) Field of Classification Search .................. 703/13, 703/21; 714/30, 43; 710/2, 3, 316; 709/201, 709/231, 224, 208, 220; 370/392, 469, 449; 340/687; 711/148
See application file for complete search history.

(56) References Cited

U.S. PATENT DOCUMENTS

| | | | | |
|---|---|---|---|---|
| 6,658,469 B1* | 12/2003 | Massa et al. | ................. | 709/224 |
| 7,725,608 B2* | 5/2010 | Diamant | ........................... | 710/2 |
| 7,853,663 B2* | 12/2010 | Hoerl et al. | ................... | 709/208 |
| 7,979,592 B1* | 7/2011 | Pettey et al. | ...................... | 710/3 |
| 2003/0051195 A1* | 3/2003 | Bosa et al. | ...................... | 714/43 |
| 2006/0215697 A1* | 9/2006 | Olderdissen | ................. | 370/469 |
| 2007/0067481 A1* | 3/2007 | Sharma et al. | ................ | 709/231 |
| 2007/0233825 A1* | 10/2007 | Brownell et al. | ............ | 709/220 |
| 2008/0059556 A1* | 3/2008 | Greenspan et al. | .......... | 709/201 |
| 2008/0256284 A1* | 10/2008 | Evoy et al. | .................... | 710/316 |
| 2008/0301379 A1* | 12/2008 | Pong | ............................ | 711/148 |
| 2009/0080428 A1* | 3/2009 | Witkowski et al. | .......... | 370/392 |
| 2009/0296731 A1* | 12/2009 | Lida et al. | .................... | 370/449 |
| 2009/0300419 A1* | 12/2009 | Silverman et al. | ............. | 714/30 |
| 2010/0141466 A1* | 6/2010 | Nguyen et al. | ................ | 340/687 |

* cited by examiner

*Primary Examiner* — Kandasamy Thangavelu
(74) *Attorney, Agent, or Firm* — Klein, O'Neill & Singh, LLP

(57) ABSTRACT

Method and system for processing a management operation command received from a management entity is provided. The management operation command is received by an emulation module for a switch element operationally coupled to the management entity. The switch element includes a plurality of ports, each port having a plurality of components designated as managements devices. The emulation module determines if identification information for a management device in the command matches with identification information stored by the switch element to emulate the management device. If the information matches, then the management operation identified in the management operation command is performed by the emulation module interfacing with a switch element processor.

15 Claims, 11 Drawing Sheets

EMULATION OF MULTIPLE MDIO MANAGEABLE DEVICES

CROSS REFERENCE TO RELATED APPLICATION

This application claims priority under 35 USC 119(e) to US provisional patent application, entitled "EMULATION OF MULTIPLE MDIO MANAGEABLE DEVICES", Ser. No. 61/091,701, filed on Aug. 25, 2008, the disclosure of which is incorporated herein in its entirety.

BACKGROUND

The present disclosure relates to networks.

RELATED ART

Networking systems are commonly used to move network information (may also be referred to interchangeably, as frames, packets or commands) between computing systems (for example, servers) or between computing systems and network devices (for example, storage systems). Various hardware and software components are used to implement network communication. Different network and storage protocols may be used to handle network information and storage information. Continuous efforts are being made to enhance the use of networking and storage protocols.

SUMMARY

In one embodiment, a method for processing a management command received from a management entity for a management operation is provided. The method includes: (a) receiving the management command at an emulation module for a switch element operationally coupled to the management entity, the switch element having a plurality of ports, each port having a plurality of components designated as managements devices; (b) determining if identification information for a management device in the command matches with identification information stored by the switch element to emulate the management device; and (c) performing the management operation identified in the management command; wherein the emulation module interfacing with a switch element processor performs the management operation on behalf of the identified management device, without the management entity being aware of the emulation.

In another embodiment, a method for processing a Management Data Input/Output (MDIO) command for a MDIO operation received from a management entity is provided. The method includes: (a) receiving the MDIO command at a MDIO emulation module for a switch element operationally coupled to the management entity, the switch element having a plurality of ports, each port having a plurality of components designated as MDIO Manageable Devices (MMDs); (b) determining if identification information for a MMD in the MDIO command matches with identification information stored by the switch element to emulate the MMD; and (c) performing the MDIO operation identified in the MDIO command. The MDIO emulation module interfacing with a switch element processor performs the MDIO operation on behalf of the identified MMD, without the management entity being aware of the emulation.

In yet another embodiment a system for processing a MDIO command for performing a MDIO operation is provided. The system includes a management entity for sending the MDIO command for performing the MDIO operation. The system also includes a switch element for receiving and responding to the MDIO command. The switch element includes a plurality of ports, each port having a plurality of components designated as MMDs. The switch element also includes a control port for storing information identifying an MMD and a port where the MMD resides, such that if the command identifies the MMD, then a MMD emulation module interfacing with a switch element processor emulates the identified MMD and responds to the MDIO command, instead of the MMD directly responding to the management entity.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1:
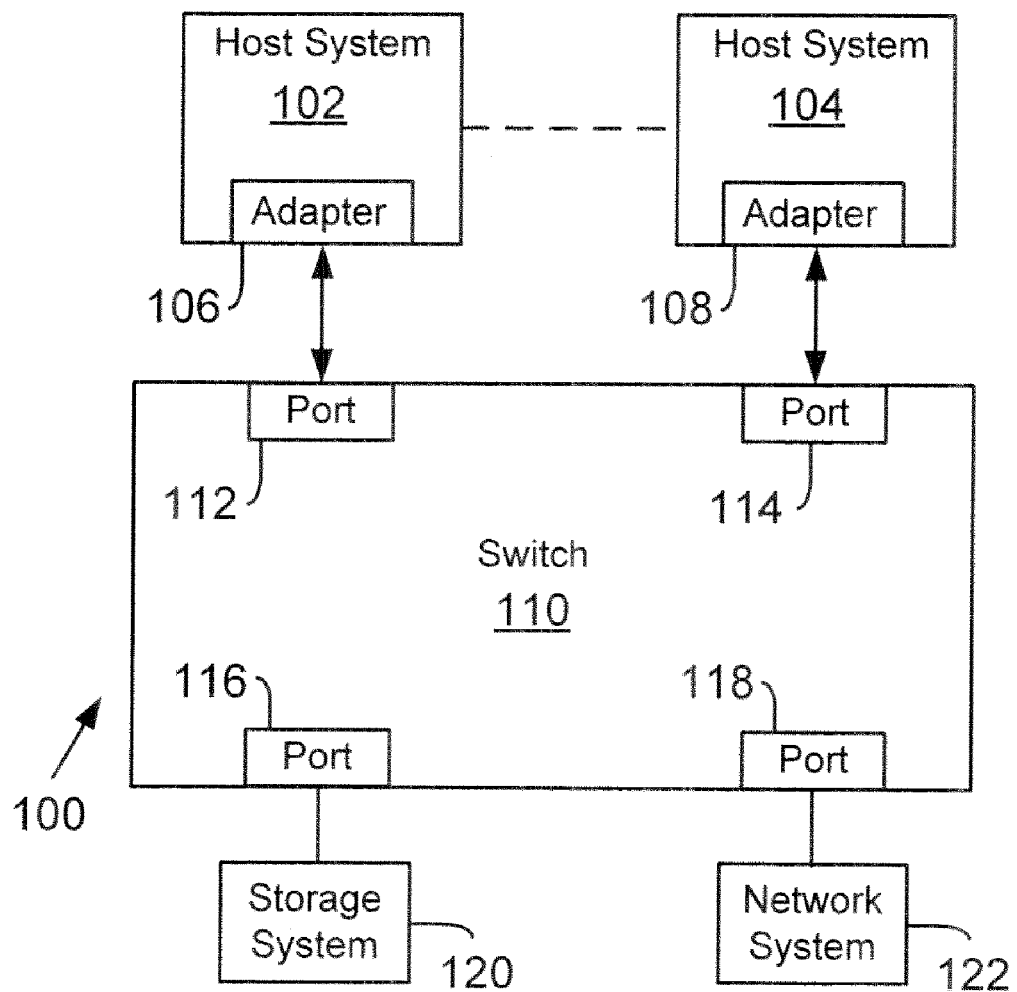
FIG. 1 shows a block diagram of a network system, according to one embodiment.

To facilitate an understanding of the various embodiments, the general architecture and operation of the network and storage protocols will first be described. The specific architecture and operation of the various embodiments will then be described with reference to the general architecture. Various adaptive embodiments, without limitation are described herein. It should be understood that the embodiment is not limited to any particular embodiment.

Network Protocols: Various network protocols are commonly used today for sending and receiving network information. One such protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabits per second (Gb). The description of the various embodiments described herein are based on using Ethernet (which includes 100 Base-T and/or Gigabit Ethernet) as the network protocol, however, the adaptive embodiments disclosed herein are not limited to any particular protocol, as long as the functional goals are met by an existing or new network protocol.

Storage Protocols: One common storage protocol used in storage area network is Fibre Channel. Fibre Channel supports three different topologies, point-to-point, arbitrated loop and Fabric. The point-to-point topology attaches two devices directly. The arbitrated loop topology attaches devices in a loop. The Fibre Channel Fabric topology attaches host systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port. Fibre Channel switches use memory buffers to hold frames received and sent across a network. Associated with these buffers are credits, which are the number of frames that a buffer can hold per Fabric port.

Converged Network and Storage Protocols: Continuous efforts are being made to develop converged protocols that can process both network and storage information. One such developing standard is Fibre Channel Over Ethernet (FCOE). This standard is being developed so that network adapters and other devices (for example, switches) are able to handle both network and storage traffic.

"MDIO": MDIO means Management Data Input/Output ("MDIO") Interface, a bus structure defined for the Ethernet protocol by the industry standard, IEEE 802.3 Clause 45. MDIO is defined to connect Media Access Control (MAC) devices with PHY devices, providing a standardized access method to internal registers of PHY devices. These internal registers provide configuration information to the PHY layer. The MDIO bus allows a user to change configuration information during operation, as well as read the PHY's status.

The MDIO interface is typically implemented by using two pins, an MDIO pin and a Management Data Clock (MDC) pin. A device driving an MDIO bus is commonly called a station management entity (STA), and the device managed by the STA is typically called the MDIO Manageable Device (MMD). The STA drives the MDC line, initiates a command using an MDIO frame and provides a target register address. During a write command, the STA also provides the data. In the case of a read command, the MMD takes over the bus and supplies the STA with the data.

"PHY" means the physical layer of the Open systems Interconnection Reference Model (OSI). A PHY connects a link layer device (often called a MAC) to a physical medium such as an optical fibre or copper cable. A PHY typically includes a physical coding sub layer (PCS) and a physical medium dependant (PMD) sub layer.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Network System:

FIG. 1 shows a block diagram of a system 100 using a switch 110, according to one embodiment. System 100 includes a plurality of host computing systems 102, 104 that are coupled to a switch 110 via adapters 106 and 108, respectively.

Adapters 106 and 108 may be converged host bus adapters that can support both network and storage traffic. In one embodiment, adapter 106 and adapter 108 support the Fibre Channel Over Ethernet (FCOE) standard to process both Ethernet (network) and Fibre Channel (storage) traffic. QLogic Corporation, the assignee of the present application provides converged adapters 106 and 108.

Switch 110 may be coupled to a storage system 120 and a network server (also referred to as "network system") 122. Network server 122 sends and receives network traffic. Storage system 120 sends and receives storage data to and from host systems 102 and 104.

Switch 110 may also include a plurality of ports, for example, port 112, 114, 116 and 118. Ports 112, 114, 116 and 118 may be used to receive and transmit both network and storage related information. The term information in this context means, frames, packets, data, commands and others.

Figure 2:
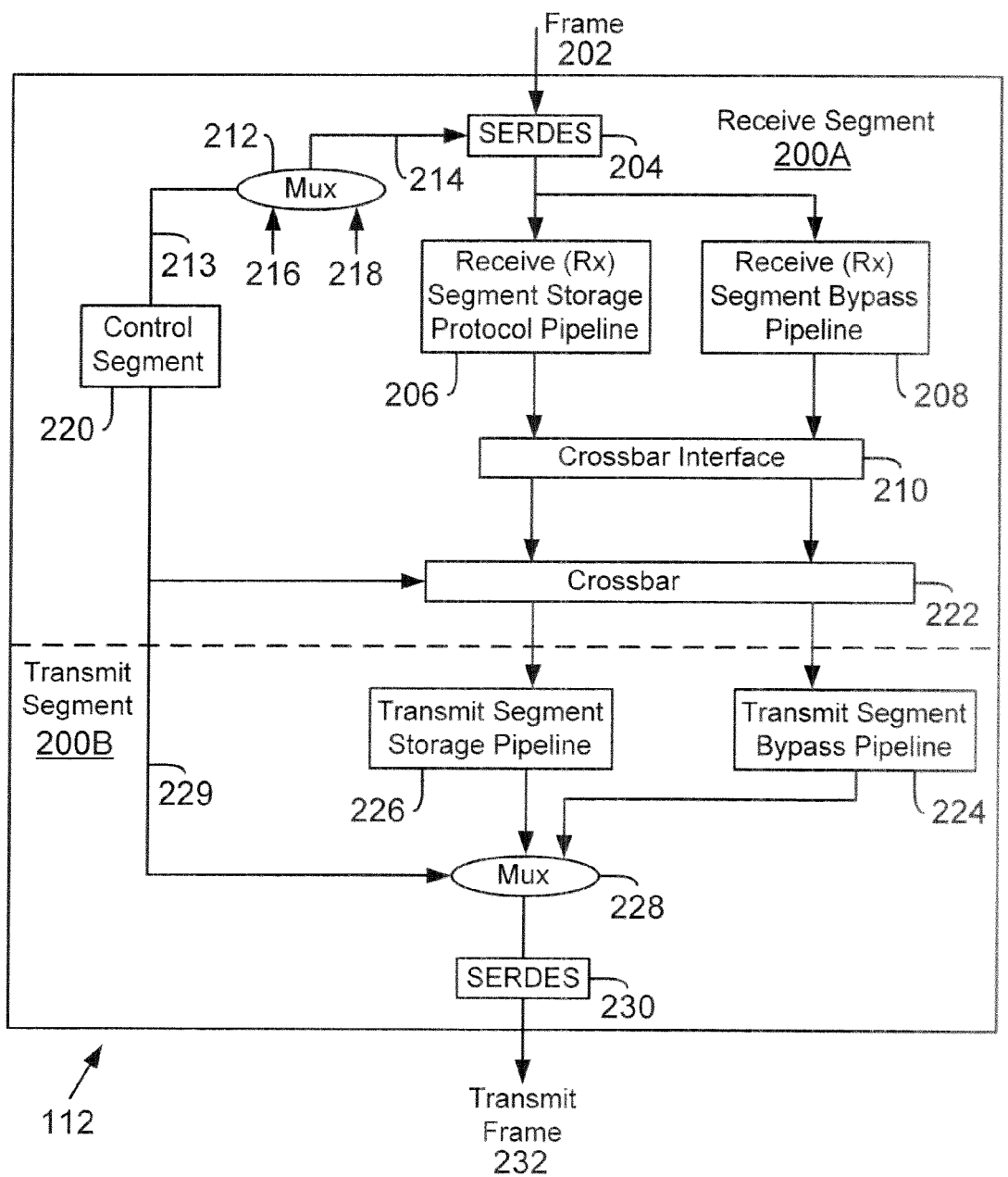
FIG. 2 shows a block diagram of a port, according to one embodiment.

Port 112:

FIG. 2 shows a block diagram of port 112 having a receive segment 200A and a transmit segment 200B. Receive segment 200A receives a frame (packet or information, used interchangeably) 202 and transmit segment 200B transmits the frame. Frame 202 may be a network frame or a storage packet and is processed depending on whether port 112 is operating in a storage mode (for example, in a Fibre Channel Mode) or a network mode (for example, in an Ethernet Mode).

Frame 202 is received by a SERDES (serial/de-serializer) 204. SERDES 204 serializes and de-serializes information. SERDES 204 is configured to operate in either a storage mode (for example, a Fibre Channel mode operating as a standard Fibre Channel port for handling Fibre Channel traffic) or in a network mode (for example, as a pass through Ethernet port handling network traffic).

SERDES 204 operating mode may be based on a reference clock 214 selected by a multiplexer ("Mux") 212 based on a plurality of inputs. For example, Mux 212 may receive two or more input clock signals 216 and 218. Input clock signal 216 may be used to select a storage operating mode, for example, a Fibre Channel mode to operate port 112 as a Fibre Channel port. Input clock signal 218 may be used to select a network operating mode, for example, Ethernet operating mode when port 112 operates as an Ethernet port. It is noteworthy that Mux 212 may receive more than two inputs to configure port 112 operate modes. Although for clarity Mux 212 is shown outside SERDES 204, Mux 212 may be a part of SERDES 204.

One of the input clock signals 216 and 218 is selected based on a control signal 213 that is generated by a control segment 220. Control segment 220 may be programmed by a user to change the port operating configuration, based on user needs.

When port 112 operates in a storage mode, for example, as a Fibre Channel port, storage traffic goes through a Storage Protocol Pipeline 206. When operating in a non-storage mode, for example, as a network port, network traffic goes through bypass pipeline 208.

After incoming network or storage frames (for example, 202) have been processed by pipelines 206 and 208, the frames are sent to the transmit segment 200B via a crossbar interface 210 and crossbar 222. Crossbar interface 210 interfaces between crossbar 222, the storage pipeline 206 and bypass pipeline 208. Crossbar interface 210 is used for making any adjustments that may be needed when transmitting network and storage frames.

The transmit segment 200B processes outgoing network and storage traffic using a transmit bypass pipeline 224 and a transmit storage pipeline 226. If outgoing traffic is storage traffic, then it is processed by the transmit storage pipeline 226. Transmit storage pipeline 226 is designed to handle storage protocol related traffic. Non-storage traffic (for example, network traffic) is processed by transmit bypass pipeline 224.

Transmit traffic via crossbar 222 is sent to SERDES 230 via Mux 228. Control signal 229 is sent to Mux 228 to select information from either transmit bypass pipeline 224 or transmit storage pipeline 226. Based on the selection, transmit traffic 232 is sent to its destination.

Switch (or switch element) 110 of the present disclosure is presently implemented as a single CMOS ASIC, and for this reason the term "switch element" and application specific integrated circuit (ASIC) are used interchangeably to refer to the various embodiments in this specification.

Figure 3:
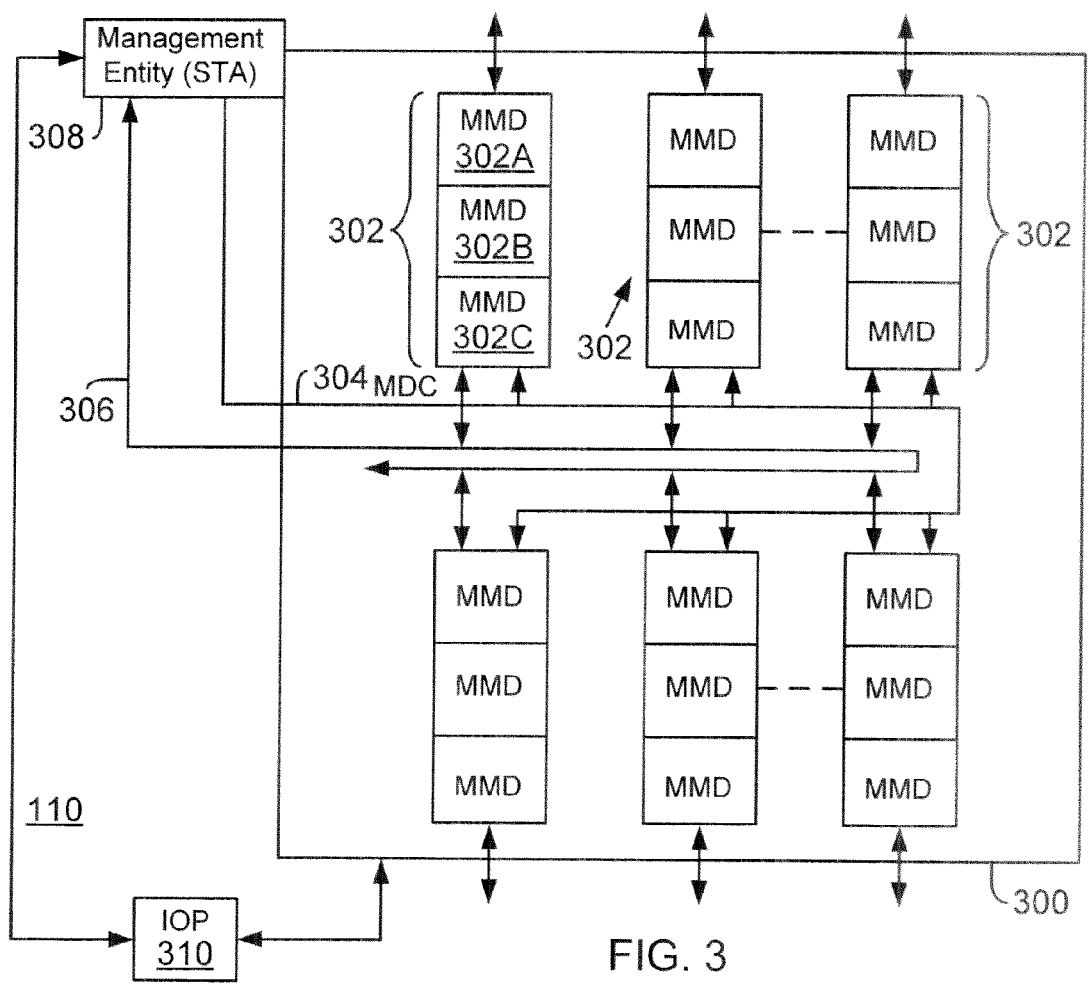
FIG. 3 shows a block diagram of a system for managing MDIO Manageable Devices (MMDs)

System with MMDs:

FIG. 3 shows a block diagram of a conventional system 300 for managing MMDs for switch 110. Each port (for example, 112) includes a plurality of MDIO Manageable Devices (MMDs) 302 representing different switch port (for example, 112) components. For example, 302 includes MMD 302A that may be a link serial/de-serializer ("SERDES") represented by a Physical Media Attachment (PMA) or a Physical Media Dependent (PMD) module, MMD 302B may be a Physical Coding Sublayer (PCS) and MMD 302C may be a Physical Coding Sublayer (PCS). Some of the MMDs may be accessed directly via a physical link, while others may have to be abstracted.

A station management entity (STA) 308 driving a MDIO bus 306 manages the plurality of MMDs 302 (may also be referred to as a set of MMDs). STA 308 communicates with a processor (may also be referred to as an Input/Output Processor) (IOP) 310 of switch 110. STA 308 drives the MDIO BUS line 306, initiates a command using an MDIO frame and provides a target register address and provides MDC 304 for the MMDs 302. MDC line 304 may operate at a frequency 2.5 MHz. During a write command, STA 308 provides data. For a read command, the MMD 302 takes over MDIO bus 306 and supplies data to STA 308. In one embodiment, STA 308 may be a computing device with at least a processor and memory.

In conventional system 300, each set of MMDs (i.e. 302A-302C) are built using unique copies of hardware circuit. This may not be commercially desirable because it has multiple copies of hardware circuits which increase costs and complexity of the overall ASIC design.

Figure 4A:
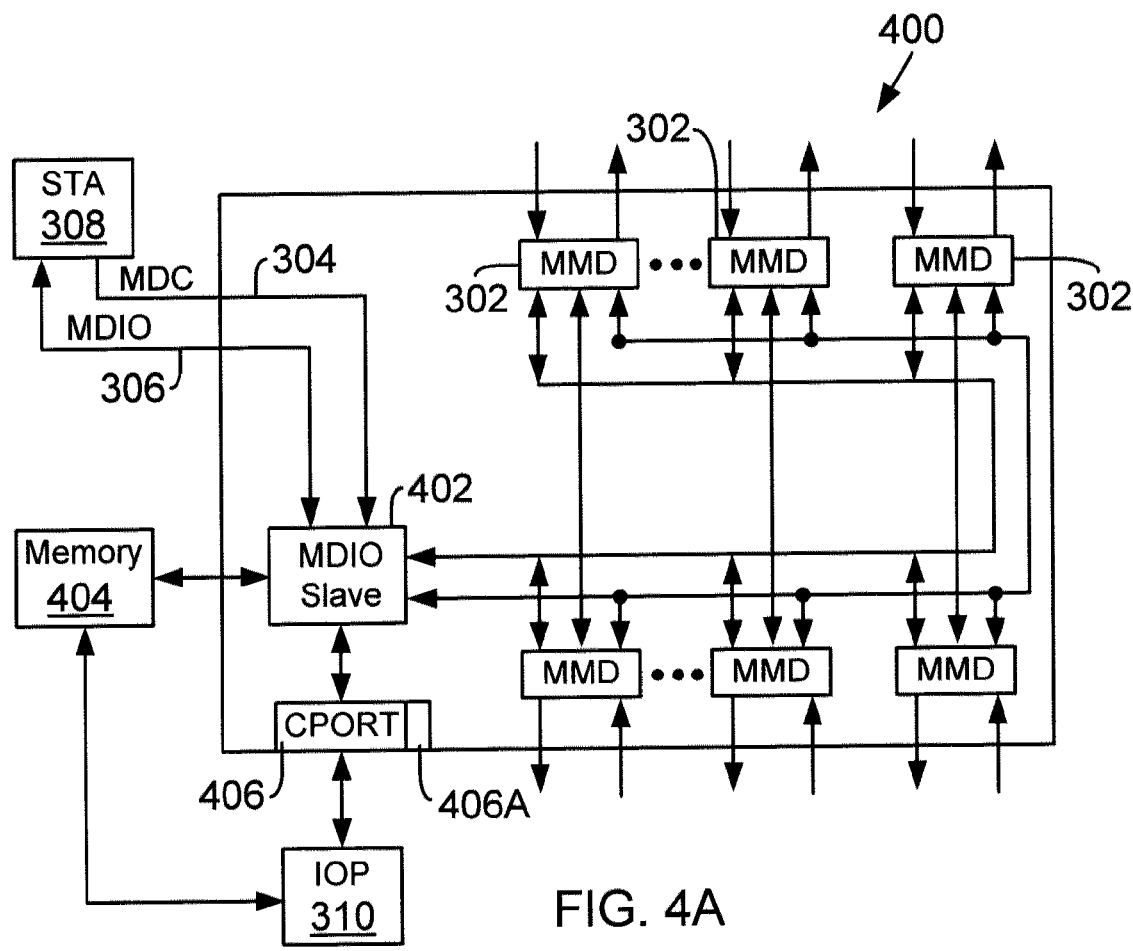
FIG. 4A shows a system having a MDIO slave module for managing MMDs, according to one embodiment.

System 400:

The embodiments disclosed herein emulate a plurality of MMDs so that unique copies of the hardware circuits for each link and MMD are not used. This allows for maintaining software compatibility as the features within the MMDs may change between hardware revisions or generations. FIG. 4A shows a system 400 having a MDIO slave module 402 (hereinafter "slave module 402") that assists in emulating various MMDs, according to one embodiment so that direct communication with the plurality of MMDs (for example, 302A-302C, FIG. 3) at each port may not be needed. MMDs that are emulated are identified in a control port register 406A maintained by control port 406. An external computing system (not shown) or IOP 310 may be used to configure CPORT 406

Slave module 402 receives MDIO commands and status bits from STA 308. The MDIO command may be to write information, read information or for loading a particular address at a register. Slave module 402 has access to a memory 404 that may be a non-volatile and dual ported memory array. Details of memory 404 layout are provided below.

In one embodiment, slave module 402 may also be able to communicate with a control port (CPORT) 406 that includes control and status registers 406A. Registers 406A are used to store control and status information. IOP 310 can read and write to CPORT registers 406A. The CPORT registers 406A are described below.

System 400 also includes some of the components of system 300, such as STA 308, MDC line 304, MDIO bus 306 and IOP 310 that are described above.

Figure 4B:
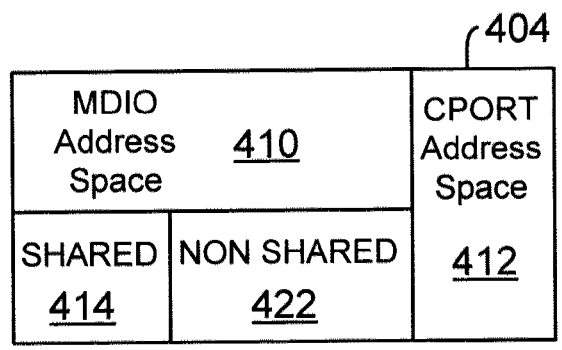
FIG. 4B shows an example of a memory layout, according to one embodiment.

Memory Layout:

FIG. 4B shows an example of a layout for memory 404, according to one embodiment. Memory 404 may be divided into a shared area 414 and an unshared (or non-shared) second area 422. The memory is configured as a dual port so it can be accessed simultaneously by the IOP 310 and the slave module 402.

When a MDIO command is received for a particular MMD, slave module 402 or IOP 310 determines if the MMD is emulated. The information to determine if an MMD is emulated may be stored in a CPORT register 406A.

If the MMD identified in the MDIO packet is emulated then IOP 310 creates an image for the MMD. The image may include a MMD device address, a port number where the MMD resides, the address of the memory itself and current values of the emulated MMD registers. This information may be stored in the shared area 414. The shared area 414 may store multiple images for different MMDs simultaneously or may store a single image using an on-demand approach replace the image when required.

The unshared area 422 of memory 404 may be used to store an image (i.e. a MMD device address, a port number where the MMD resides and the address of the memory itself) for a single MMD that is being serviced at any given time. It is noteworthy that unshared area 422 may be used for a vendor specific MMD and may be used as a message mailbox between STA 308 and IOP 310.

Figure 5:
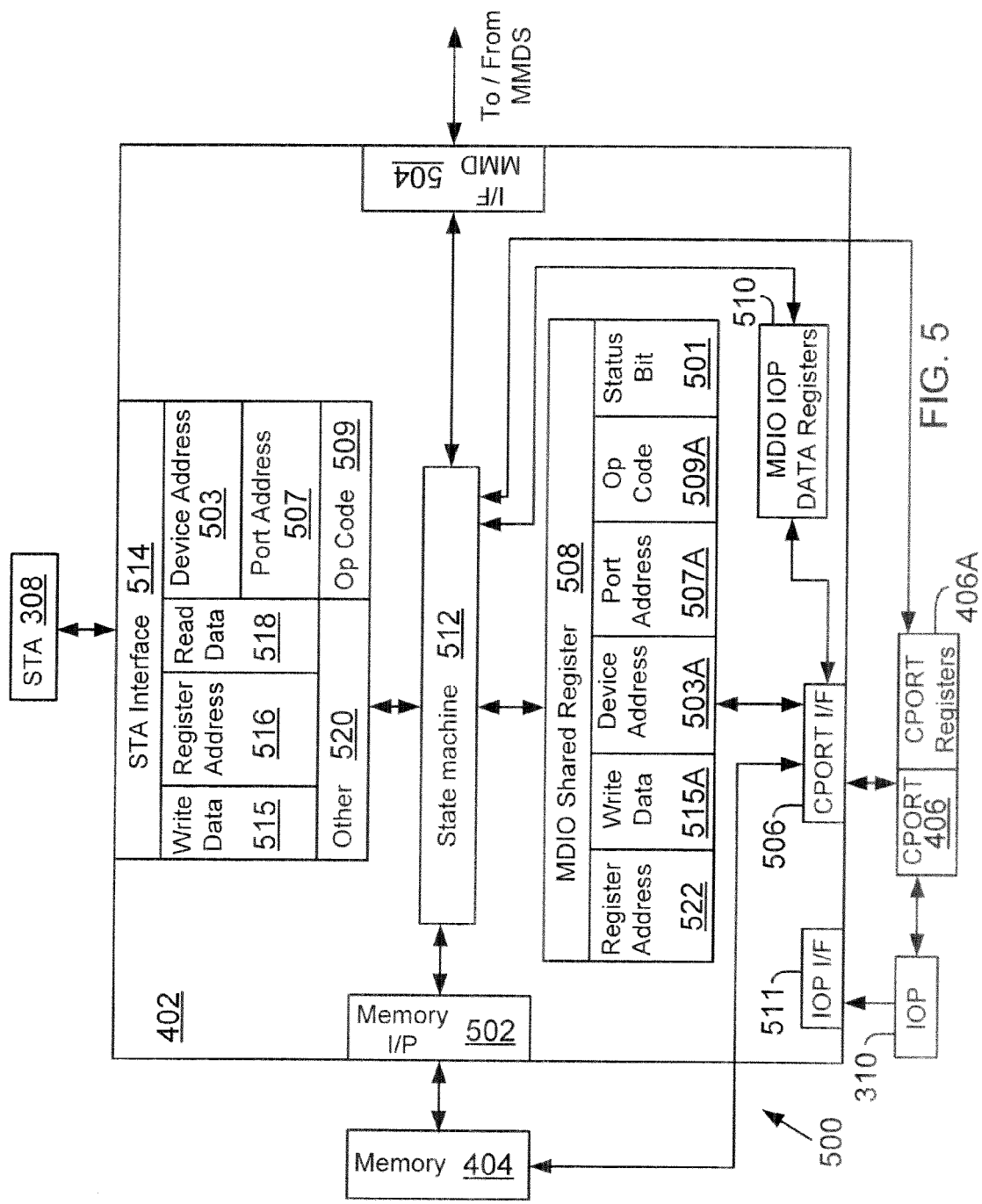
FIG. 5 shows a top level block diagram of a system for managing MMDs, according to one embodiment.

Slave Module 402:

FIG. 5 shows a top level block diagram of a system 500 with slave module 402 (may also be referred to as MDIO emulation module) interfacing with STA 308, memory 404, IOP 310 and CPORT 406, according to one embodiment. Slave module 402 interfaces with STA 308 via a STA interface 514. STA interface 514 may be used to store information that is received from STA 308 as well as information that may be sent to STA 308. The nature of the information stored depends on the commands/requests from STA 308.

STA interface 514 may include various registers or a single register with multiple entries to store a plurality of values. For example, STA interface 514 includes a location to store device address (may also be referred to as Device Address) 503, port address (may also be referred to as Port Address) 507 and Operation Code (Op Code) 509 that are received from STA 308. STA interface 514 also stores a register address 516, write data 515 and read data 518. Besides the foregoing, STA interface 514 may store other information 520.

The device address 503 is the address of the involved in an STA 308 initiated operation. The port address 507 is the address of the port where the MMD resides. The write data 515 is the data that STA 308 wants to write to an MMD for a write operation. The read data 518 includes information sent to STA 308 in response to a read operation.

The OpCode 509 defines an operation initiated by STA 308 in a MDIO packet. Operations include, write information to a MMD or emulated MMD, reading from a MMD or emulated MMD or loading an address from STA 308. The register address 516 provides an address of a MMD register. The register address may be a location from where STA 308 wants to read information or a location where STA 308 wants to write data.

The Op Code 509, register address 516 and write Data 515 may be read by slave module MDIO state machine 512 (may also be referred to as state machine 512) and then written to an MMD at a specified register address.

STA 308 typically sends a MDIO packet to slave module 402. The packet has different fields that are received and temporarily stored at STA interface 514. For example, STA interface 514 may be used to store the device address 503 (i.e. address of a MMD or emulated MMD), the port address 507 (i.e. address of a port where the MMD or emulated MMD resides) and Op Code 509.

After the STA Interface 514 receives a MDIO packet, it loads the packet information from interface 514 to a MDIO register 508 (may also referred to as MDIO shared register). MDIO shared register 508 stores a register address 522 (similar to address 516), write data 515A (similar to write data 515), device address 503A (similar to device address 503), port address 507A (similar port address to 507) and Op Code 509A (similar to OpCode 509).

As an example, the MDIO Shared Data Register(s) 508 include read/write vectors that allows IOP 310 to emulate MMDs for multiple ports. In one embodiment, there may be 64 registers, each 16-bits wide.

An example of a MMD that might need to be emulated is a PMA. IOP 310 allows STA 308 to control a SERDES for a given port. IOP 310 writes data that is read by STA 308 and read data that is written by STA 308. As described below, IOP 310 responds to incoming MDIO commands by loading memory 404 with the proper values that may get read on a next MDIO command.

Slave module 402 also includes MDIO IOP data registers 510 that are used for controlling slave module 402 operations and overall reporting status. MDIO IOP Data Registers 510 are read/write vectors that allow IOP 310 to communicate with STA 308. In one example, there are may be 16 registers, each 16-bits wide. IOP 310 writes data that is read by STA 308 and reads data that is written by STA 308.

IOP Data Registers 510 may also be used to hold MMD register values for emulated MMDs like Devices in Package for MMDs at register addresses 5 and 6, as defined by Clause 45 of IEEE Standard 802.3-2005. These values may be used to substitute an output from any MMD whether it is emulated or not.

Slave module 402 interfaces with memory 404 via interface 502. Slave module 402 interfaces with MMDs via MMD interface 504. Slave module 402 interfaces with CPORT 406 via CPORT (also referred to as CPORT I/F) interface 506. IOP 310 may also interface with slave module 402 directly via IOP interface 511 or via CPORT using CPORT interface 506. The structure and nature of these interfaces will depend on the type of connection/link/bus that is being used. For example, if a Peripheral Computer Interface (PCI) bus is being used to connect IOP 310 to slave module 402, then IOP interface 511 will include logic and hardware to comply with the PCI standard and protocol. The adaptive embodiments are not limited to any particular protocol.

When a MDIO packet with fields 501, 503, 507 and 509 are received, the state machine 512 loads these values in MDIO register 508. IOP 310 (or state machine 512) determines if the device address in the MDIO packet is for a MMD that can be emulated by comparing a device address in the MDIO packet with a device address that may be stored in CPORT register 406A and/or memory 404. The CPORT register 406A may be used to store information regarding MMDs that are to be emulated. For example, CPORT 406A may store a table with device address and port address identifying the MMDs that can be emulated.

If the MMD is one that can be emulated, then IOP 310 creates an image of supported MMD registers for the MMD identified by 503 and 507 in memory 404. Based on the Op Code in the packet, state machine 512 (or IOP 310) performs the necessary operations on behalf of the MMD to read register data, write register data or load an address. Based on the performed operation, information is provided to STA 308 via STA interface 514. STA 308 believes that the addressed MMD is responding to the MDIO packet and is unaware that slave module 402/IOP 310 is emulating the MMD behavior and response.

The following provides a brief description of the various registers/fields that may be used in the FIG. 5 blocks, according to one embodiment.

CPORT Status Register: This register is a read/write register in CPORT (for example, 406A). The bits set in this register are a reflection of a hardware state of the slave module 402. This register is updated when a new MDIO command is received by STA interface 514.

Device_Adrs: The device address field (for example, 503) includes the device address from a last operation received by the STA interface 514. It is updated to a new value even if no IOP 310 action is required. The field identifies the MMD that will most likely be read or written on a next MDIO command.

Port_Adrs This field includes the Port Address (for example, 507) from a last operation received by the STA Interface 514. This field gets updated to a new value even if no IOP 310 action is required. The field identifies the port that will most likely be read or written on a next MDIO command.

OP_Code: This field contains the Op Code (509) from a last operation received by the STA Interface 514 and gets updated to a new value even if no IOP 310 action is required. The following values may be used for different types of operations:

| Op Code Value | Operation |
|---|---|
| 00 | Load Address |
| 01 | Write Data |
| 11 | Read Data and then increment the register address |
| 11 | Read Data |

State machine 512 increments the register address 522 after a read is complete when required by the Op Code. If the increment causes the register address to exceed certain value, for example, a count of 63 for the MDIO Shared Data Registers 508 or 15 for the MDIO IOP Data Registers 510, slave module 402 will set the Action_Required status bit.

New_Operation: This bit in a MDIO packet (for example, status bit 501) is set each time a new operation is received by STA interface 514. This bit is set until cleared by IOP 310.

"Action_Required": This bit may be a part of status bit 501 in a MDIO packet and is set each time a new operation is received by STA interface 514 that requires IOP 310 action. In other words, the STA interface 514 receives a load address operation, write operation or a read increment operation causing an address roll over- and one of the four Device Addresses (described below) in CPORT Registers 406A match the incoming operation. This bit is not set for read data operations and read increment operations that do not cause an address roll-over or if the device address does not match as described below. The term address roll-over above, refers to the register address 522.

If an operation is for a port address that is not supported, data register 518 may be loaded with all ones as that will appear like a non-response to the port address.

The Action_Required status bit is cleared by the IOP 310 after it has completed a requested operation. If a new operation is received by STA interface 514 before this bit is cleared then a MDIO_Slave_Error bit is set to indicate that one or more operation may have been lost.

MDIO_Slave_Error: This bit (for example, in status bit 501) is set if an MDIO Slave Interface 514 error is detected. An error is detected if a new operation is received before the Action_Required bit is cleared by IOP 310. Once this bit is set it will stay set until cleared by IOP 310 or when the register is reset.

There may be a race condition that may occur when the Action_Required bit is cleared just as MDIO_Slave_Error bit is being written as part of a register write that is clearing the Action_Required bit. In such a situation, state machine 512 causes the error bit to be set and not cleared by the register write. In other words, this bit is cleared when the Action_Required is inactive. If both bits require clearing it will require two IOP 310 write operations or a register reset operation.

MDIO IOP Data Registers 510: The MDIO IOP Data Registers 510 are read/write vectors that allow IOP 310 to communicate with STA 308. In one example, there are may be 16 registers each 16-bits wide. IOP 310 writes data that is read by the STA 308 and reads data that is written by STA 308.

CCR14(4:0)::Device_Adrs0: This register is a part of CPORT 406A and is used by slave module 402 to compare against incoming MDIO commands. If an incoming MDIO command's device address 503 matches the device address stored in this register, then slave module 402 responds to the command. Incoming commands/operations that match this device address are mapped to a dedicated non-shared area 422 of Memory 404. It is noteworthy that this device address may be mapped into a vendor specific MMD for use in communication between STA 308 and IOP 310.

CCR14(12:8)::Device_Adrs1: This register may be a part of CPORT 406A and is used by slave module 402 to compare against incoming MDIO commands. If the incoming MDIO command's device address 503 matches this field then slave module 402 responds to the command. This device address may be mapped to a MMD that IOP 310 is emulating. Incoming commands that match this device address are mapped to a shared area 414 of Memory 404 and shared with the other Device Addresses except CCR14(4:0)::Device_Adrs0 described above.

CCR14(20:16)::Device_Adrs2: This register may also be a part of CPORT registers 406A and is used by slave module 402 to compare against incoming MDIO commands. If the incoming MDIO command's device address 503 matches this field the MDIO slave will respond to the command. This device address may be mapped into an emulated MMD. Incoming commands that match this Device Address are mapped to the shared area 414 of Memory 404 and shared with the other Device Addresses except CCR14(4:0)::Device_Adrs0.

CCR14(28:24)::Device_Adrs3: This register may also be a part of CPORT registers 406A used by slave module 402 to compare against incoming MDIO commands. Slave module 402 responds to a MDIO command, if an incoming MDIO command's device address 503 matches this field. This device address may be mapped to an emulated MMD. Incoming commands that match this device address are mapped to a shared area 414 of Memory 404 and shared with the other device addresses except CCR14(4:0)::Device_Adrs0.

The functions of various components of slave module 402 are further described with respect to the various process flow diagrams.

Figure 6:
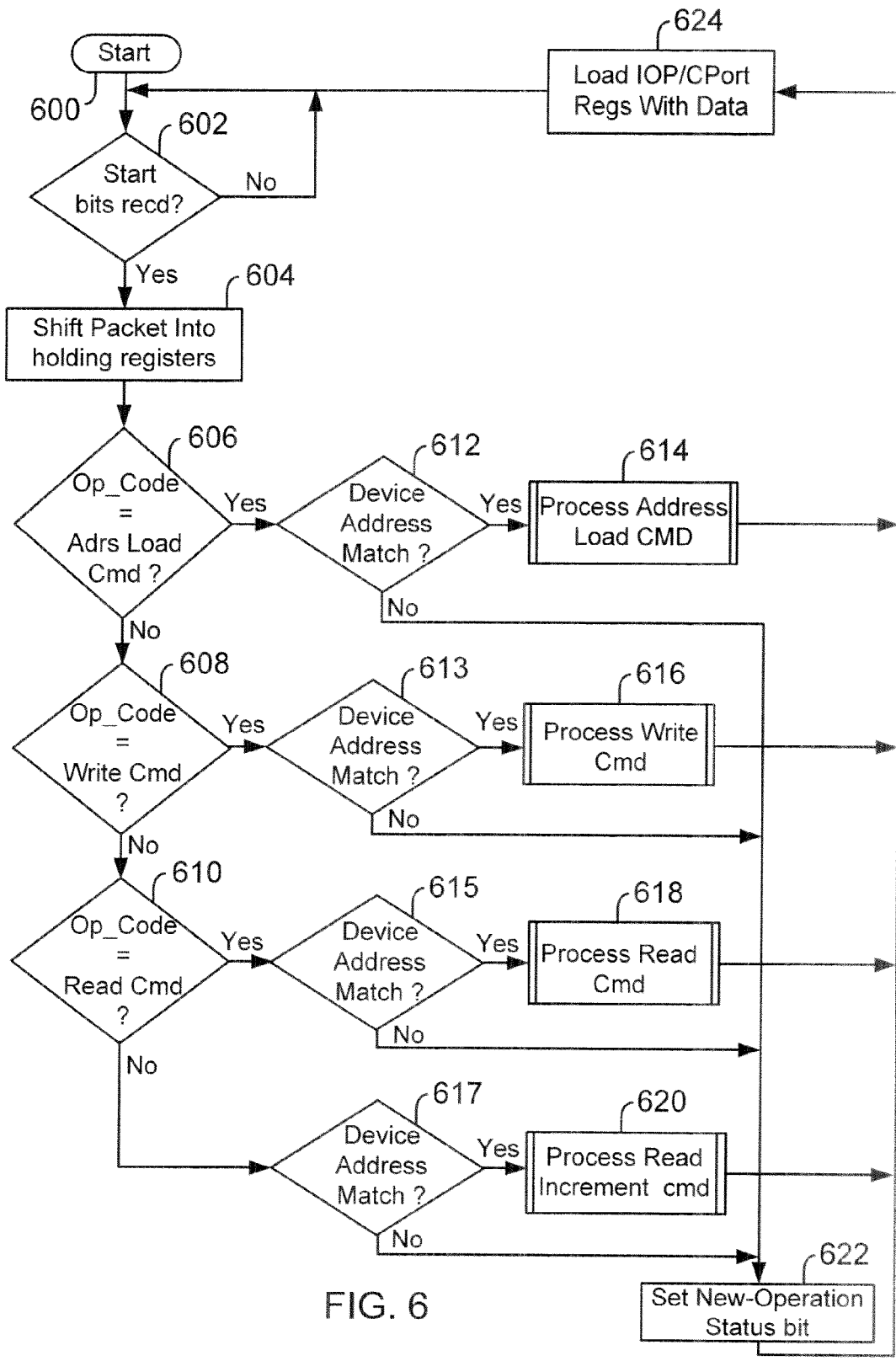
FIG. 6 shows a process flow diagram illustrating operations of slave module in accordance with an embodiment of the present disclosure.

Process Flow:

FIG. 6 shows a process flow diagram illustrating the operations of slave module 402 in accordance with an embodiment of the present disclosure. The process starts in block 600 and in block 602, slave module 402 determines if start bits have been received from STA 308.

If start bits are not received in block 602, then the process (or slave module 402) simply waits until the start bits are received.

If a start bit is received, then in block 604, the packet information (i.e. device address 503, port address 507 and register address 516) is shifted into a holding register for example, MDIO registers 508. Next, in block 606, the OP Code 509 is checked to determine if it references an address load operation. During this operation, a register address for a MMD is loaded. If an address load operation is referenced, then in block 612 the process compares the device address received in the MDIO packet with the device address stored in CPORT register 406A. IOP 310 or slave module 402 performs this process step to determine if the referenced MMD is one that can be emulated. If there is a device address match, then the address load command is processed in block 614 that is described below in detail with respect to FIG. 7A.

If there is no device address match in block 612, the process moves to block 622 described below.

If there is no OpCode for loading a register address command in block 606, the process moves to block 608 when slave module 402 determines if there is a write command. For a write command, STA 308 intends to write to a MMD address. If there is a write command, then slave module 402 verifies the device address in block 613, similar to block 612 described above. If there is an address match, then the write command is processed in block 616 described below in detail with respect to FIG. 7B. If there is no device address match, the process moves to block 622 that is also described below.

If there is no write command in block 608, then in block 610, slave module 402 determines if the OpCode specifies a read command. During a read command, STA 308 intends to read information from a MMD location. If a read command is specified, then slave module 402 performs a device address match in block 615 similar to block 612 described above. If there is an address match, the read command is performed in block 618 described below with respect to FIG. 7C. If there is no device address match, the process moves to block 622 that is described below.

If a read command was not specified in block 610, then in block 617, slave module determines if a device address in the MDIO packet matches with a CPORT 406A device address. If there is a match, then the process executes a read increment command in block 620, otherwise the process moves to block 622.

In block S622, a new operation status bit is set. Thereafter, in block 624, IOP and/or CPORT registers are loaded with data. The loaded data would depend on the type of operations performed by slave module 406 and IOP 310.

FIGS. 7A-7D show process flow diagrams representing embodiments of each of the process blocks 614, 616, 618 and 620, respectively.

Figure 7A:
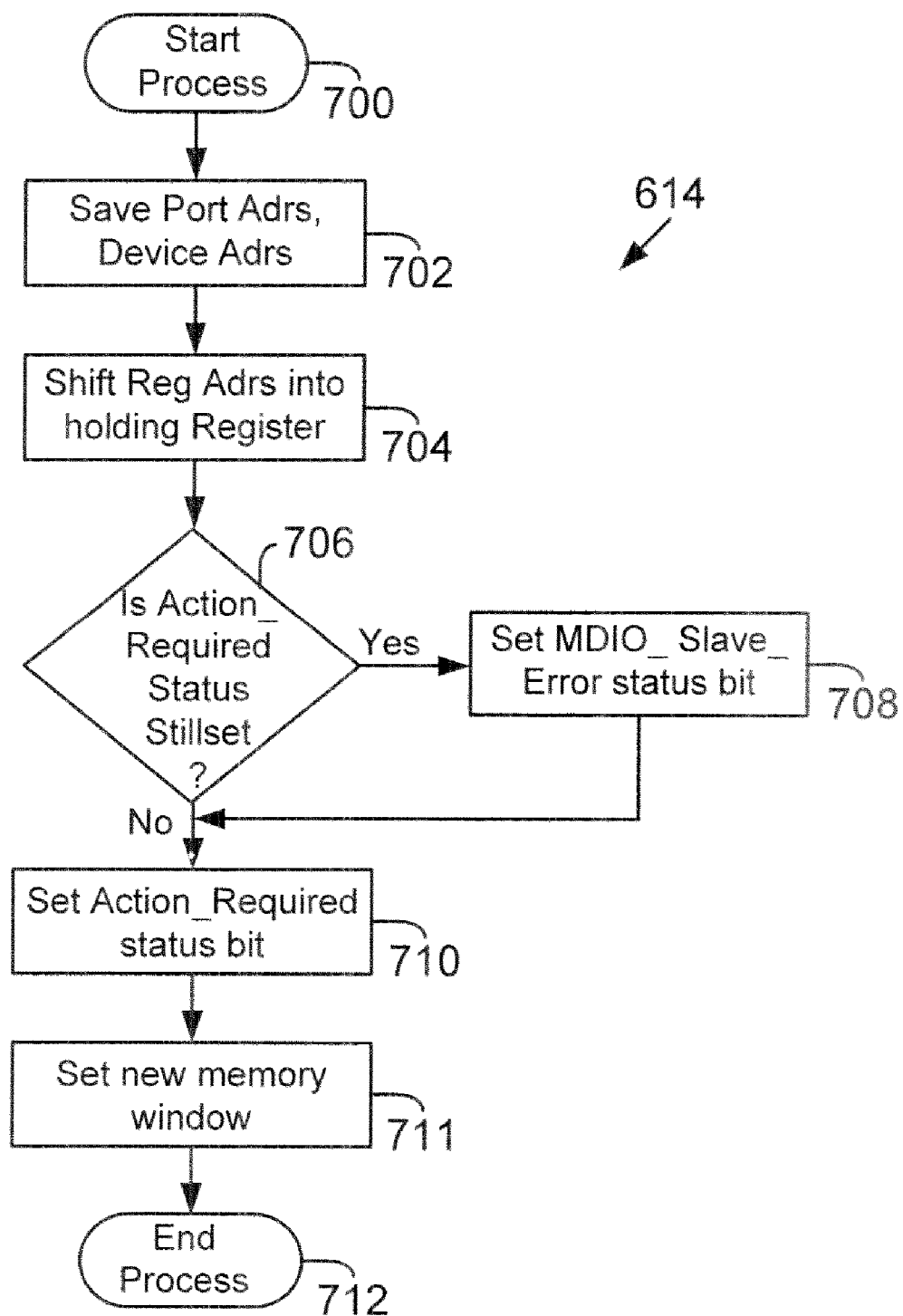
FIGS. 7A-7D show other process flow diagrams, according to one embodiment.

In FIG. 7A, the process for an address load operation 614 starts in block 700. In block 702, the device address and the port addresses that were matched in block 612 are saved by slave module 402. In one embodiment the addresses are saved in STA Interface 514 by slave module 402.

In block 704, the register addresses are loaded into MDIO registers 508.

In block 706, the process determines if an "Action Required" status bit is still set. If yes, then in block 708, state machine 512 sets the MDIO Slave Error status bit that is defined and described above and process moves to block 710. If the Action Required bit is not set, then in block 710, the Action Required status bit is set. Thereafter, in block 711, a new memory window is defined at memory 404. The memory window is unique for each port and MMD (device address). This new memory window may overwrite an existing window or may just be a different location within memory 404. Once the memory window is defined, IOP 310 will load a copy of the emulated MMD's register values into memory 404 to form an image of the emulated MMD's registers and the process ends in block 712.

Figure 7B:
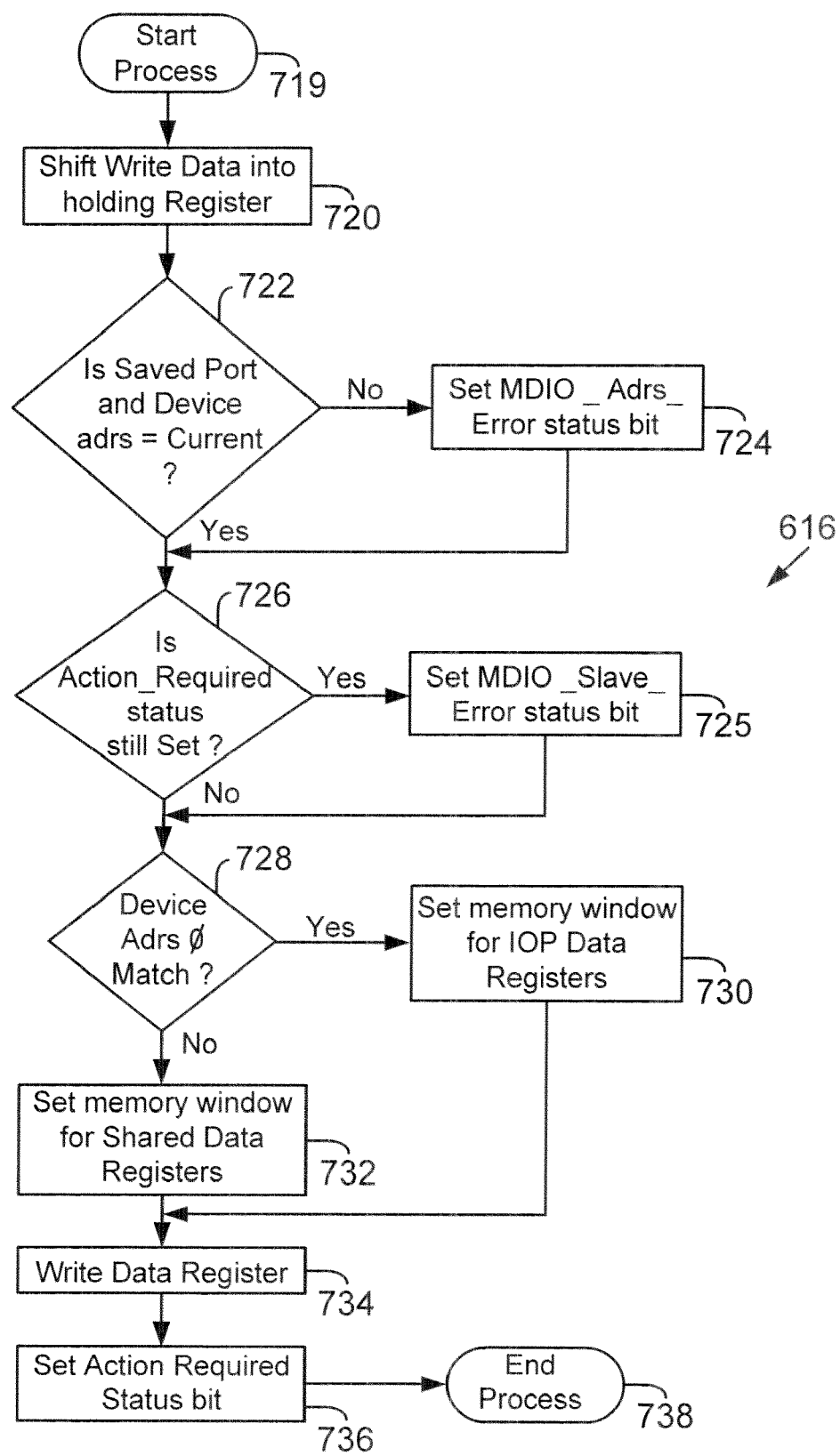

FIG. 7B shows a detailed process flow diagram for the write operation described above with respect to 616 of FIG. 6. The process starts in block 719 and in block 720, the write data for an addressed MMD is written in MDIO registers 508 (shown as 515A, FIG. 5).

In block 722, slave module 402 determines if the device address and the port address for the write data operation are still current and valid. Slave module 402 verifies the port and device address with information stored at CPORT register 406A. If not, then in block 724, the slave module 402 sets a MDIO Address Error status bit and process moves to block 726.

If the port and device address are still current, then in block 726, state machine 512 determines if the "Action required" status bit is still set. If yes, then in block 725, state machine 512 sets the MDIO Slave Error status bit and process moves to block 728.

If the Action required status bit is not set, then in block 728, slave module 402 compares the device address in the MDIO packet with stored addresses in CPORT register 406A.

If there is a match, then in block 730 then IOP 310 sets a memory window in memory 404 and process moves to block 734. The memory window is set in shared area 414. The term memory window here means that memory 404 operates as a cache to store the emulated MMD register values in the shared memory address space 414.

If there is no match, then in block 732 a memory window is set in the shared space 414 of memory 404. Thereafter, in block 734 the state machine 512 or IOP 310 writes data into the defined memory window in memory 404. Next in block 736, an Action Required status bit is set and the operation ends in block 738.

Figure 7C:
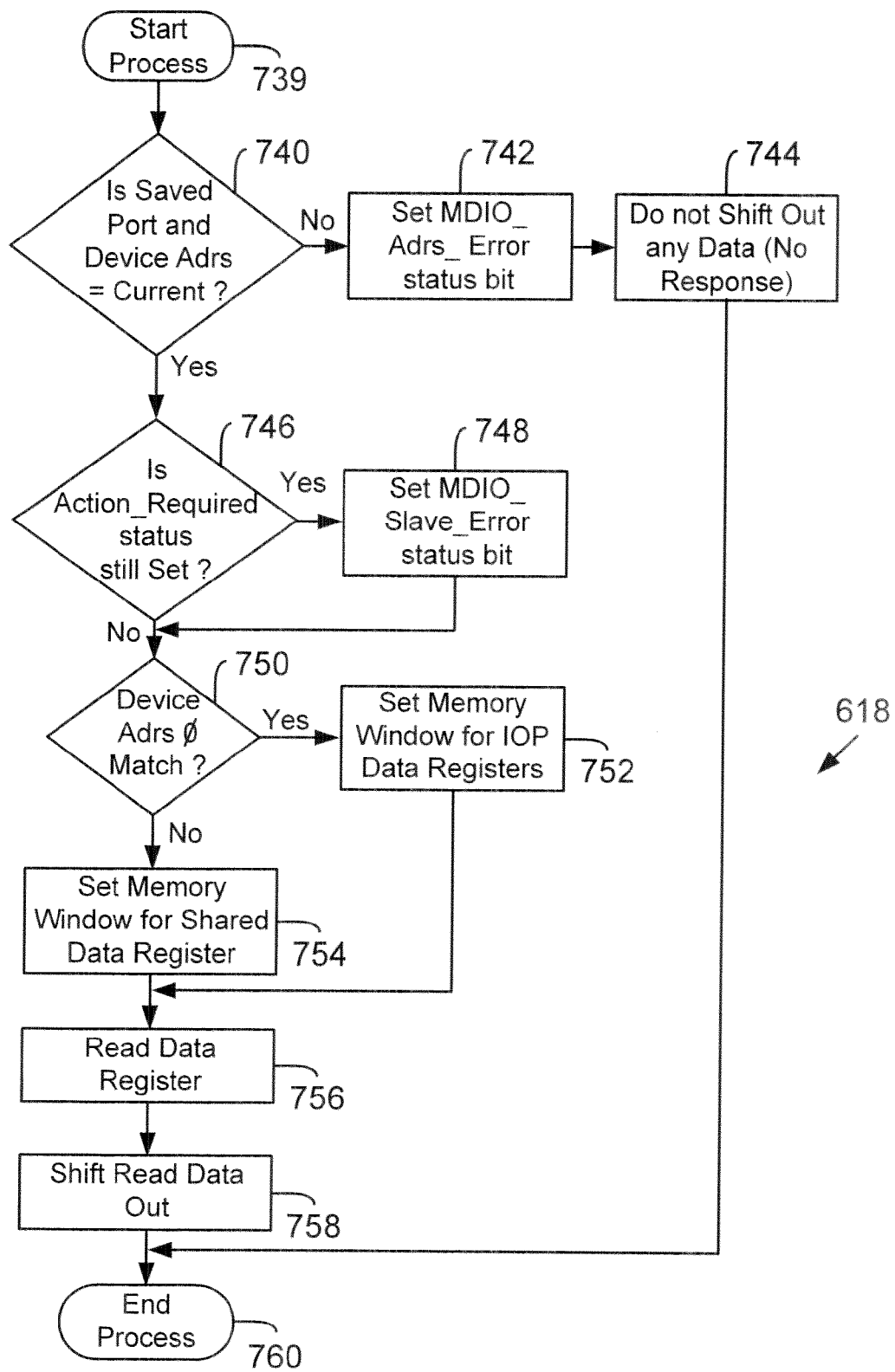

FIG. 7C shows a process flow diagram for a read operation 618 mentioned above with respect to FIG. 6. The process starts in block 739 and in block 740, slave module 402 determines if the saved port and device address are still current. Slave module 402 verifies this information with information stored in CPORT register 406A. If the information is not current, then in block 742, state machine 512 sets a MDIO Address Error status bit and no response is provided in block 744.

If the port and device address are current, then in block 746, state machine 512 determines if the "Action required" bit is still set. If yes, then the MDIO Slave Error status bit is set in block 748 and process moves to block 750.

If the Action Required status bit is not set in block 746, then in block 750, slave module 402 determines if there is a device address match for a memory window in the non-shared area 422.

If there is an address match, then in block 752 a memory window is set in memory 404 by IOP 310 (or slave module 402). The memory window may be set in non-shared memory area 422 and process moves to block 756. If there is no device match, then in block 754, a memory window is set for shared data registers i.e. in shared area 414.

In block 756, the shared data register is read by state machine 512 from memory 404. The data is then moved to STA interface 514 so that it is sent to STA 308 during the data phase of the MDIO command/operation. The process ends in block 760.

Figure 7D:
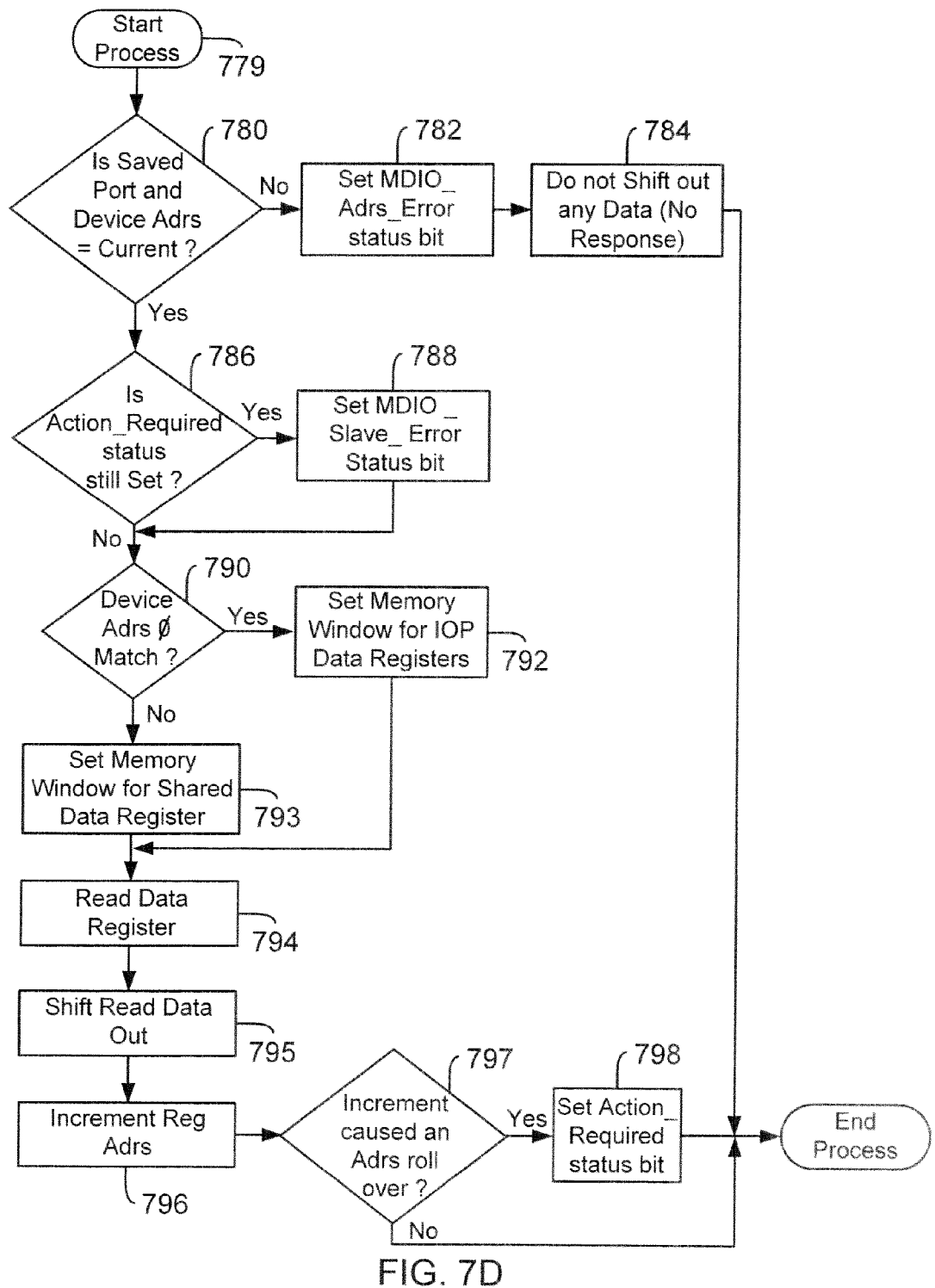

FIG. 7D shows a process flow diagram for executing a read increment command, mentioned above in block 620 with respect to FIG. 6. During the read increment command data is read by STA 308 and register address 522 is incremented.

The process starts in block 779 and in block 780, slave module 402 determines if the saved device and port address in register 406A are still current. If the addresses are not current, then in block 782, a MDIO Address Error bit is set and no data is shifted in block 784.

If the address in block 780 is still current, then state machine 512 determines if an Action Required status bit is set and process moves to block 790. If yes, then in block 788, the MDIO Slave Error Status bit is set. If in block 786, the Action Required status bit is not set, then in block 790, the slave module 402 determines if there is an address match. Slave module 402 compares the address in the MDIO packet with addresses stored in CPORT register 406A or any other location.

If there is an address match, then in block 792 a memory window is set for state machine 512 at non-shared space 422 and process moves to block 794. If there is no address match, then in block 793, a memory window is set in shared space 414. In block 794, the shared space is read and in block 795, the read data is shifted out to STA 308. In block 796, the register address 522 is incremented.

In block 797, state machine 512 determines if in incrementing (or increasing) the address in block 796 caused an address roll over i.e. exceed a certain count. If yes then in block 798, an Action Required status bit is set and the process ends in block 799. If in block 797, no address roll over is caused, then the process simply ends in block 799.

Figure 8:
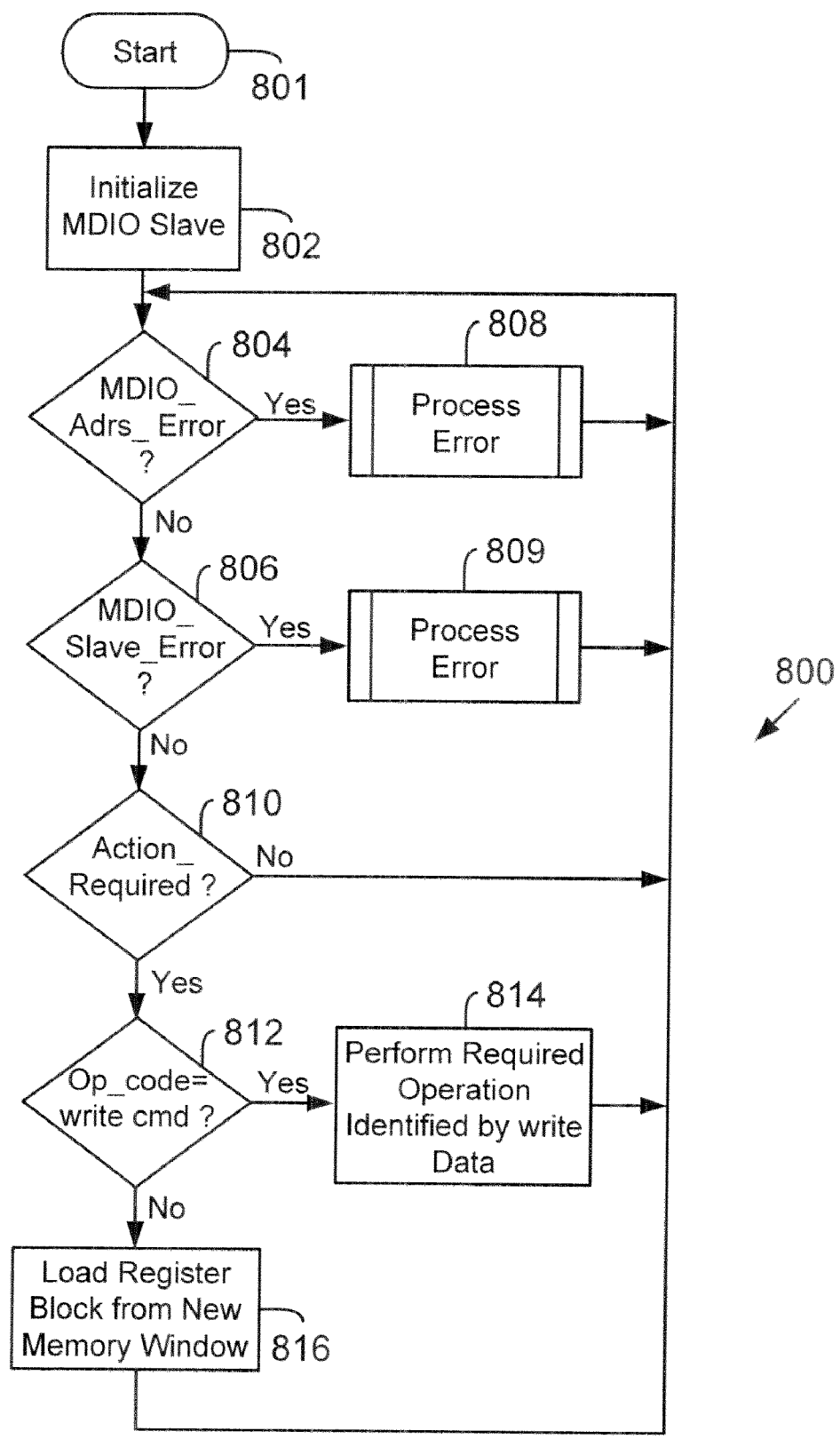
FIG. 8 is a flow diagram showing switch element processor operations with respect to MDIO emulation, according to one embodiment.

FIG. 8 is a flow diagram 800 showing IOP 310 operations with respect to MDIO emulation, according to one embodiment. The process starts in block 801 and after the slave module 402 is initialized. In block 804, IOP 310 checks to see if there are any MDIO address errors (as set in blocks 724, FIG. 7B, 742 of FIG. 7C and 782 of FIG. 7D). If yes, then the error is processed in block 808.

If there are no MDIO address errors then in block 806, IOP 310 determines if there if a MDIO slave error bit is set, for example, in block 725 of FIG. 7B, block 748 of FIG. 7C and block 788 of FIG. 7D, described above. If the MDIO slave error is set, then the error is processed in block 809 by IOP 310.

If MDIO slave error bit is not set then in block 810, IOP 310 determines if an action is required. If no action is required, the process reverts to block 804. If an action is required, then in block 812, IOP 310 determines if the OpCode in a MDIO packet is for a write command. If yes, then the operation identified by the write command is performed in block 814. If the write command is not mentioned in the OpCode, then in block 816, a new register block is loaded into a new memory window as previously defined in block 711.

The embodiments disclosed facilitate efficient communication between both emulated and non-emulated MMDs. A response to a MDIO packet for an emulated MMD is provided by slave module 402/IOP 310. A non-emulated MMD may continue to respond as permitted by IEEE Standard 802.3. The user has the option to configure some MMDs for emulation and have other MMDs respond per the industry standard. This allows flexibility and optimizes use of hardware circuitry for MDIO communication.

Furthermore, although the examples of the various embodiments are described with respect to MDIO, the adaptive embodiments are applicable to any other protocol/standard wherever a management entity intends to perform a management operation with respect to management devices (for example, MMDs).

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A system, comprising:
a management entity for sending a Management Data Input/Output (MDIO) command for performing a MDIO operation; and
a switch element for receiving and responding to the MDIO command, the switch element comprising:
a plurality of ports, each port having a plurality of components designated as MDIO Manageable devices (MMDs); and
a control port for storing information identifying an MMD and a port where the MMD resides, such that if the command identifies the MMD, then a MMD emulation module interfacing with a switch element processor emulates the identified MMD and responds to the MDIO command, instead of the MMD directly responding to the management entity:
wherein the MMD emulation module maintains information for the emulated MMD in a shared register; and
wherein the switch element processor creates a memory window with information from the shared register at a memory operationally coupled to the MMD emulation module and the switch element processor.

2. The system of claim 1, wherein the MDIO operation is a write operation to write data to the identified MMD or a read operation for reading information from the identified MMD.

3. The system of claim 1, wherein some of the plurality of MMDs are emulated and some of the plurality of MMDs interface directly with the management entity.

4. The system of claim 1, wherein the MDIO operation is for loading a MMD register address.

5. The system of claim 1, wherein the memory includes a shared area for storing a plurality of memory windows with information for more than one emulated MMDs.

6. The system of claim 1, wherein the memory includes a non-shared area dedicated to a single emulated MMD.

7. A method for processing a Management Data Input/Output (MDIO) command for a MDIO operation received from a management entity, comprising:
(a) receiving the MDIO command at a MDIO emulation module for a switch element operationally coupled to the management entity, the switch element having a plurality of ports, each port having a plurality of components designated as MDIO Manageable devices (MMDs);
(b) determining if identification information for a MMD in the MDIO command matches with identification information stored by the switch element to emulate the MMD; and
(c) performing the MDIO operation identified in the MDIO command; wherein the MDIO emulation module interfacing with a switch element processor performs the MDIO operation on behalf of the identified MMD, without the management entity being aware of the emulation;
wherein the MMD emulation module maintains information for the emulated MMD in a shared register; and
wherein to emulate the MMD, the switch element processor creates a memory window with information from the shared register at a memory operationally coupled to the MMD emulation module and the switch element processor.

8. The method of claim 7, wherein the MDIO operation is a write operation to write data to the identified MMD or a read operation for reading information from the identified MMD.

9. The method of claim 7, wherein some of the plurality of MMDs are emulated and some of the plurality of MMDs interface directly with the management entity.

10. The method of claim 7, wherein the MDIO operation is for loading a MMD register address.

11. The method of claim 7, wherein the memory includes a shared area for storing a plurality of memory windows with information for more than one emulated MMDs.

12. The method of claim 7, wherein the memory includes a non-shared area dedicated to a single emulated MMD.

13. A method for processing a management command received from a management entity for a management operation, comprising:
(a) receiving the management command at an emulation module for a switch element operationally coupled to the management entity, the switch element having a plurality of ports, each port having a plurality of components designated as managements devices;

(b) determining if identification information for a management device in the command matches with identification information stored by the switch element to emulate the management device; and (c) performing the management operation identified in the management command; wherein the emulation module interfacing with a switch element processor performs the management operation on behalf of the identified management device, without the management entity being aware of the emulation;

wherein to emulate the management device, the switch element processor creates a memory window with information from a shared register at a memory operationally coupled to the emulation module and the switch element processor.

14. The method of claim 13, wherein the management operation is a write operation to write data to the management device, a read operation for reading information from the management device or for loading a management device register address.

15. The method of claim 13, wherein the emulation module maintains information for the emulated management device in a shared register.

* * * * *

UNITED STATES PATENT AND TRADEMARK OFFICE
CERTIFICATE OF CORRECTION

PATENT NO.         : 8,200,473 B1                              Page 1 of 1
APPLICATION NO.    : 12/547414
DATED              : June 12, 2012
INVENTOR(S)        : Frank R. Dropps et al.

It is certified that error appears in the above-identified patent and that said Letters Patent is hereby corrected as shown below:

In column 3, line 59, after "processor," insert -- a --.

In column 8, line 49, delete "Port_Adrs" and insert -- Port_Adrs: --, therefor.

In column 9, line 3, after "exceed" insert -- a --.

In column 12, lines 9-12, after "CPORT register 406A." delete "If the information is not current, then in block 742, state machine 512 sets a MDIO Address Error status bit and no response is provided in block 744." and insert the same below "CPORT register 406A." on Col. 12, Line 10 as a New paragraph.

In column 13, line 67, in Claim 1, delete "entity:" and insert -- entity; --, therefor.

Signed and Sealed this
Twenty-eighth Day of August, 2012

David J. Kappos
*Director of the United States Patent and Trademark Office*